US006766475B2

(12) United States Patent
Segal et al.

(10) Patent No.: US 6,766,475 B2
(45) Date of Patent: Jul. 20, 2004

(54) METHOD AND APPARATUS FOR EXERCISING AN UNKNOWN PROGRAM WITH A GRAPHICAL USER INTERFACE

(75) Inventors: Alla Segal, Mount Kisco, NY (US); Morton G. Swimmer, New York, NY (US); Jean-Michel Boulay, Marseille (FR)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 09/754,804

(22) Filed: Jan. 4, 2001

(65) Prior Publication Data

US 2002/0122065 A1 Sep. 5, 2002

(51) Int. Cl.[7] .................................................. G06F 11/00
(52) U.S. Cl. ............................................ 714/38; 714/46
(58) Field of Search ............................ 714/27, 38, 46; 345/762, 803, 866

(56) References Cited

U.S. PATENT DOCUMENTS

| | | | | | |
|---|---|---|---|---|---|
| 3,345,550 | A | * | 10/1967 | Grepe | 318/804 |
| 5,475,843 | A | | 12/1995 | Halviatti et al. | |
| 5,600,789 | A | | 2/1997 | Parker et al. | |
| 5,754,760 | A | | 5/1998 | Warfield | |
| 6,061,795 | A | | 5/2000 | Dircks et al. | 713/201 |
| 6,121,964 | A | * | 9/2000 | Andrew | 345/866 |
| 6,308,146 | B1 | * | 10/2001 | La Cascia et al. | 703/22 |
| 6,317,143 | B1 | * | 11/2001 | Wugofski | 345/765 |
| 2003/0112278 | A1 | * | 6/2003 | Driskell | 345/788 |

OTHER PUBLICATIONS

Memon, Atif Soffa, Mary Lou "Regression Testing of GUIs" ACM 2003, ESEC/FSE Sep. 1–5, 2003, pp. 118–127.*
Memon et al., "Hierarchical GUI Test Case Generation Using Automated Planning", IEEE Transactions on Software Engineering (TSE), vol. 27, No. 2, Feb. 2001, pp. 144–155, XP002206692, Electronic Edition (IEEE Computer Society DL).

Yip S W L et al., Graphical User Interfaces Validation: A Problem Analysis Proceedings of the Annual Hawaii International Conference on System Sciences, XX, XX, vol. 2, Sep. 1, 1990, pp. 91–100, XP000198685.

* cited by examiner

Primary Examiner—Robert Beausoliel
Assistant Examiner—Bryce P. Bonzo
(74) Attorney, Agent, or Firm—Gail H. Zarick; Harrington & Smith, LLP

(57) ABSTRACT

A method is disclosed for automatically exercising a target application process having a Graphical User Interface (GUI), as is a system for implementing a method and a computer program, stored on a computer readable medium, that embodies the method. The method includes the computer executed steps of starting the target application process; detecting a presence of a first window opened by the target application process; processing the first window by determining a content of the first window, including a list of user controls; exercising the user controls until all of the user controls have been exercised, with user controls likely to cause termination being identified and exercised after user controls that are less likely to cause termination; and closing the first window. The step of exercising includes steps of estimating a best order of execution of user controls and text to be input to user input fields. If exercising a particular user control causes the first window to close before all of the user controls have been exercised for the first window, the method further includes steps of reopening the first window; and exercising user controls other than the particular user control unless the particular user control is required to close the first window when all of the window's user controls have been exercised. If exercising a particular user control causes the second window to open, the method includes steps of determining a content of the second window, including a list of user controls; exercising the user controls until all of the user controls of the second window have been exercised; closing the second window; and continuing the processing of the first window.

32 Claims, 6 Drawing Sheets

METHOD AND APPARATUS FOR EXERCISING AN UNKNOWN PROGRAM WITH A GRAPHICAL USER INTERFACE

FIELD OF THE INVENTION

This invention relates generally to methods and apparatus for executing and exercising an unknown executable program with a graphical user interface GUI) automatically and in a systematic manner so as to maximize code coverage, and further relates to methods for analyzing computer viruses and methods for software testing.

BACKGROUND OF THE INVENTION

For the purposes of this patent application, a Computer Virus is defined as follows: a virus is a self-replicating program or routine that spreads in a possibly modified manner without direct human interaction. Reference in this regard may be had to commonly assigned U.S. Pat. No. 5,613,002, incorporated by reference herein in its entirety.

Automatic software testing tools are known in the art. For example, reference can be had to U.S. Pat. No. 5,754,760, "Automatic Software Testing Tool", by Warfield, and to U.S. Pat. No. 5,600,789. "Automated GUI Interface Testing", by Parker et al.

Reference can also be had to U.S. Pat. No. 5,475,843, "System and Methods for Improved Program Testing", by Halviatti et al.

Certain types of computer viruses replicate only when a specific section of code is executed. This is because, unlike ordinary viruses, they insert themselves into a location in a host application that is not the entry point of the application. In order to replicate this class of viruses one must attempt to exercise every part of the program, i.e., one must attempt to achieve maximum code coverage. As can be appreciated, replicating these viruses is very difficult and time consuming, as it requires the systematic testing of every feature of the host program via the host program's GUI. Prior to this invention, the inventors are not aware of any automatic software evaluation or testing tool that would be suitable for replicating this type of computer virus.

SUMMARY OF THE INVENTION

The foregoing and other problems are overcome by methods and apparatus in accordance with embodiments of this invention.

In a first aspect this invention provides a mechanism for achieving the automatic replication of computer viruses.

In a second aspect this invention provides methods and apparatus to achieve the automatic testing of computer software applications with a user interface in such a way as to simulate the actions of an inexperienced user who is unfamiliar with the application's features. This enables testers to uncover problems that may otherwise go undetected. A benefit of this method is that problems may be uncovered in the computer code that would not be found by simply following suggested instructions in a user's manual for the application.

A method is disclosed for automatically exercising a target application process having a Graphical User Interface (GUI), as is a system for implementing the method and a computer program, stored on a computer readable medium, that embodies the method.

The method includes the computer executed steps of starting the target application process; detecting a presence of a first window opened by the target application process; processing the first window by determining the content of the first window, including a list of user controls; exercising the user controls until all of the user controls have been exercised, with user controls likely to cause termination being identified and exercised after user controls that are less likely to cause termination; and closing the first window.

The step of exercising includes steps of estimating a best order of execution of user controls and the text to be input to user input fields. If exercising a particular user control causes the first window to close before all of the user controls have been exercised for the first window, the method further includes steps of reopening the first window; and exercising the window's user controls other than the particular user control, unless the particular user control is required to close the first window after all of the window's user controls have been exercised.

If exercising a particular user control causes a second window to open, the method includes steps of determining a content of the second window, including a list of user controls; exercising the user controls until all of the user controls of the second window have been exercised; closing the second window; and continuing the processing of the first window.

The step of exercising includes steps of estimating a best order of execution of user controls and text to be input to user input fields, preferably based at least in part on information obtained from the open window. The order determination applies to all user controls, such as button controls, selection fields before edit controls, edit controls before button controls, and so forth.

After individual ones of the user controls are exercised the method includes further steps of enumerating the system windows; and determining if there has been a change in the enumerated system windows due to a new window being opened; and if there has been a change, processing the new window before resuming the processing of the first window. This aspect of the method further identifies if the newly opened window or windows are associated with the target application process by comparing a process id of the target application process with the process id of each newly opened window. If the new window is not associated with the target application process, the method continues by one of processing the new window or closing the new window; and then continuing the processing of the first window. If it is detected that a plurality of new windows have opened, the method determines if a parent-child relationship exists between the plurality of new windows. If a parent-child relationship is found to exist, the method processes the child window before processing the parent window. If a parent-child relationship is not found to exist between the plurality of new windows, the method may process the plurality of new windows in any (arbitrary) order; and then continues the processing of the first window.

The step of processing includes a step of maintaining a list of windows associated with the target application process, the list containing, for each window, the window's handle, name, class, a list of user controls contained in the window, a state of the window, and an identification of any user controls that have caused the window to close. Two windows are considered identical only if they have at least the same class, name and user controls, and if a new window has at least the same class, name and user controls as a window present in the list of windows, the new window it is not added to the list of windows, but instead the handle of the corresponding window in the list, and its user controls, are updated accordingly.

In the preferred embodiment of the method the order of processing of dialog user controls are based on their type, wherein Combo box dialog user controls are processed first, followed by Edit fields, followed by button user controls. Among the button user controls those which are most likely to cause termination are processed last.

A Combo box is one includes a list box combined with either a static control or an edit control. The list-box portion of the control may be displayed at all times, or it may only drop down when the user selects the drop-down arrow next to the control. The description of this and other controls may be found in the Microsoft Developer Network knowledge base, in particular in a publication "Visual C++ programmer guide", available from Microsoft Press.

The user controls may also include menu items and submenu items, and during the step of executing a click on a particular menu or submenu item is simulated by sending a command message such as, in the Windows™ environment, a WM_COMMAND message to the target application process, passing the command id as a parameter. The step of processing includes a further step of creating a list of all submenu items, and a step of determining an order of testing of menu items by considering both the name of each menu item and its position, with those menu items that can cause termination being executed last.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 5:
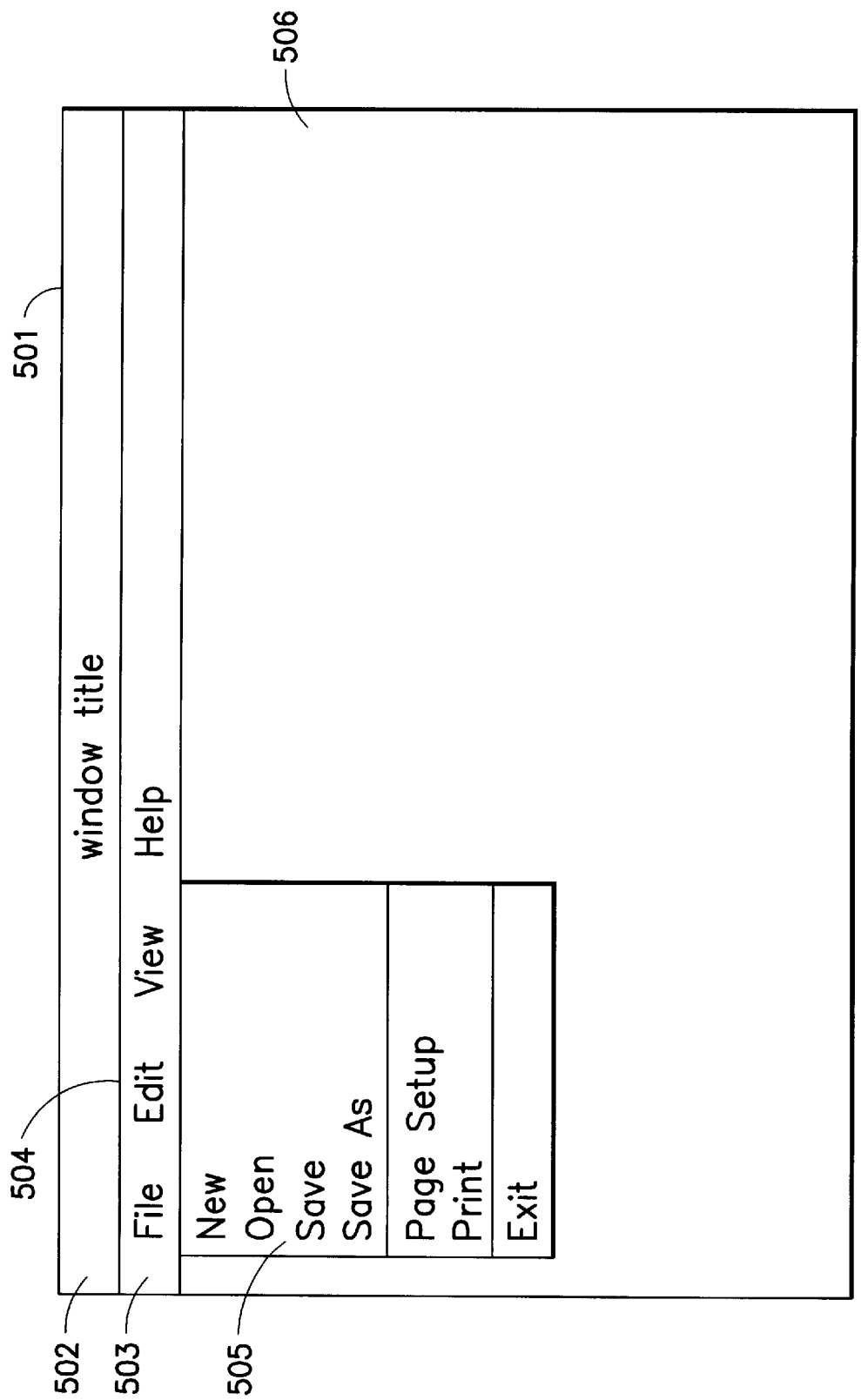
FIG. 5 shows a typical application window having a menu and an edit area.
Figure 6:
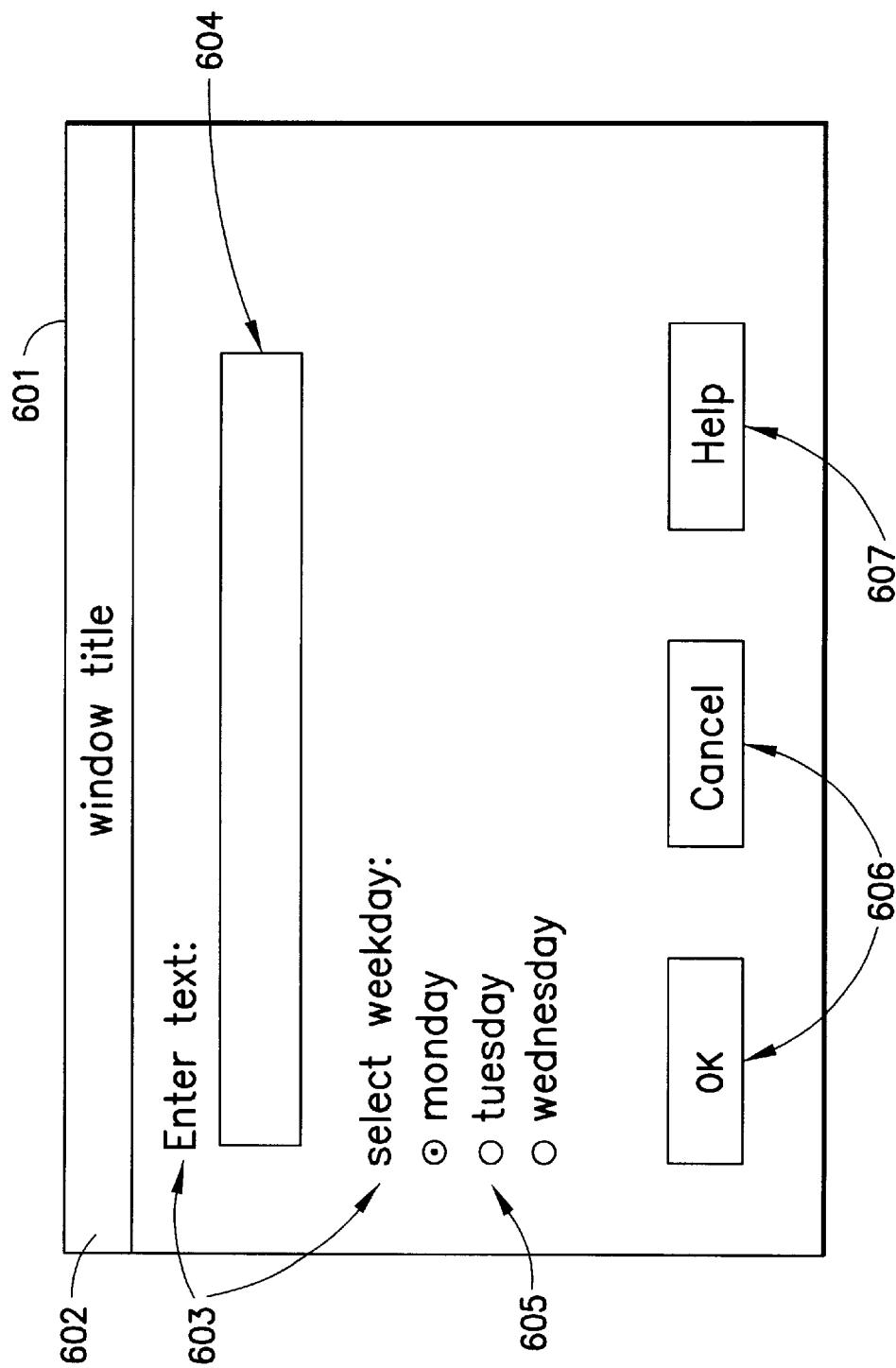
FIG. 6 depicts a typical dialog window.

By way of introduction, references is made to FIGS. 5 and 6 for showing typical application windows. A conventional application with a GUI can include one or many such windows. A typical window contains a title 501, 601 and usually a plurality of main types of interface objects: for example, a menu 504, 505 with submenus 505 and controls, or just controls. The controls include buttons of any kind such as push buttons 606, 607, radio buttons 605, check boxes, etc., as well as fields allowing user input 506 and 604, selection boxes and other interface objects. Each of these controls are themselves windows, and can be considered as "child" windows of the containing window. This child-parent relationships enables one to obtain a list of the controls displayed by each window. In the preferred embodiment of these teachings only standard types of controls are handled, as these are most common. However, the teachings are not limited to handling only standard types of controls, and a wide variety of control types can be accommodated.

Note should be had that while there is a parent-child relationship between top-level windows on the system, e.g., a dialog window that is displayed as a result of an action on a main window is considered to be a child window of the main window, the objects contained in the window are often distinguished by a special flag. For example, on a Microsoft Windows™ system the objects contained within a window have a WS_CHILDWINDOW flag turned on, while a top-level window will not. If the particular windowing being considered does not employ such flags, then the relationship may need to be estimated or guessed based on available system-specific information. For example, in a hypothetical system there may be a difference in handle numbers.

The method in accordance with these teachings automatically simulates the actions of an individual user by "clicking" on various controls and menu items, and setting information in the user-controllable fields, such as Edit boxes. An important aspect of these teachings is that no a priori knowledge of the GUI's elements is required.

While there can be several ways of sending information to another program, the presently preferred embodiment of these teachings uses windows messaging and standard Application Program Interfaces (APIs) for communication. The teachings of this invention are not, however limited for use with only one particular type of messaging and/or APIs. In general, the description of APIs and messages is platform specific and can be found in the documentation for a particular platform. As but one example, for the Windows™ environment the description of Windows APIs can be found in Platform SDK: Windows User Interface documentation available from the Microsoft Developer Network knowledge base.

Figure 1:
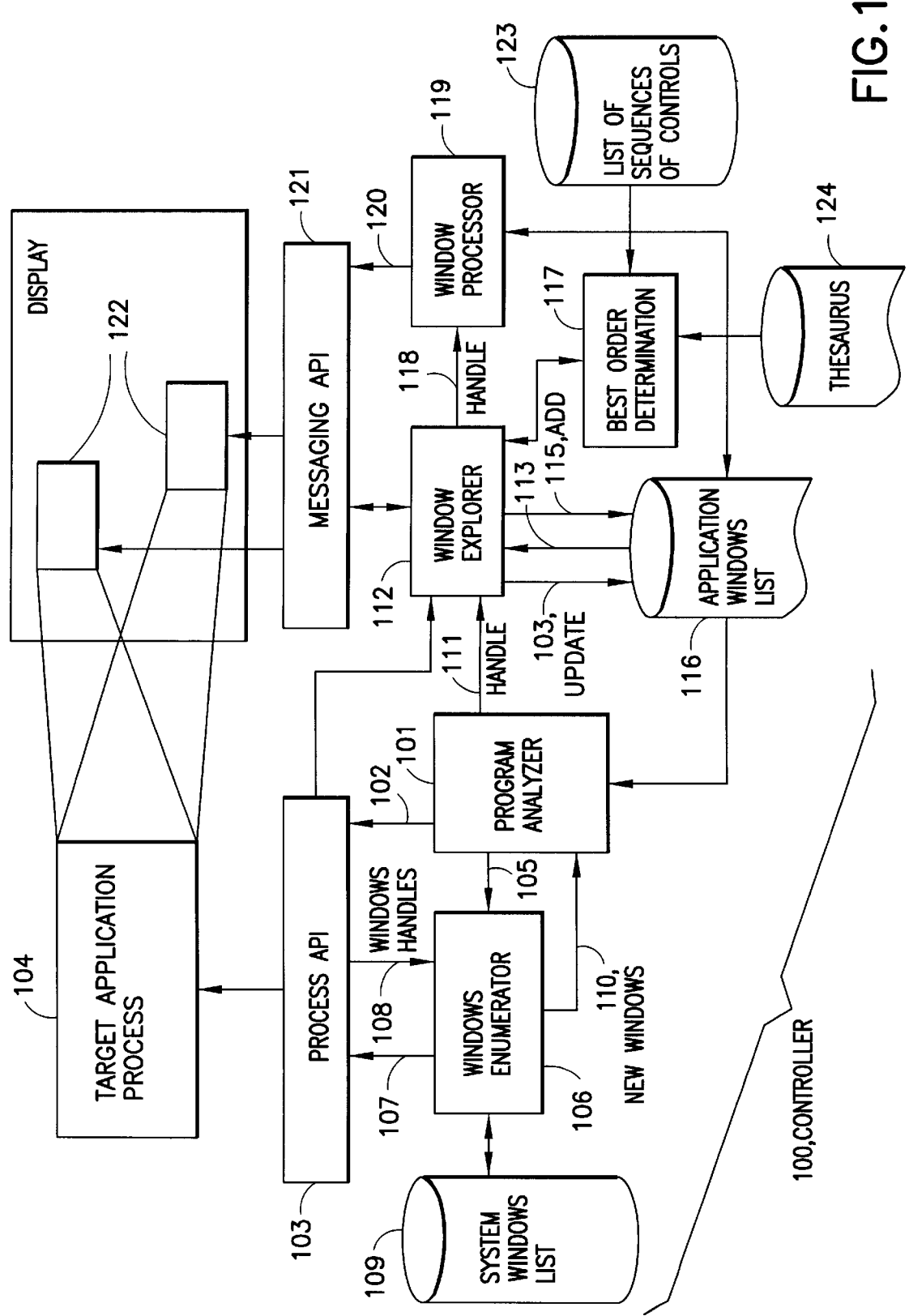
FIG. 1 is a block diagram of a data processing system that is suitable for implementing and practicing this invention.

The block diagram shown in FIG. 1 illustrates the basic structure of the system. In this diagram, a target application process 104 is assumed to display windows 122. The target application process 104 may be suspected of harboring a computer virus, such as a computer virus of the type discussed above. In order to verify the presence of the computer virus, and/or to obtain a plurality of samples or instances of the computer virus, it is necessary to exercise the target application process 104 as thoroughly as possible. The system depicted in FIG. 1 is intended to perform this task in an automatic fashion, and without having a priori knowledge of the specifics of the target application program 104 or of the various windows, including user controls and dialog boxes that its GUI may employ. The controller 100 exercises the target application process 104 using Process API 103 and messaging API 121.

In the presently preferred embodiment the main components of the controller 100 include a program analyzer 101 that controls various aspects of processing and that operates to maintain lists of windows, including those that are currently displayed in a system windows list 109 and in an application windows list 116. The controller 100 thus further includes a window enumerator 106, a window explorer 112 and a window processor 119. The windows enumerator 106 enumerates (107) all currently opened windows using Process API 103, which returns handles that uniquely identify every opened window on the windowing system. The windows enumerator 106 uses the system window list 109 to determine windows that have been opened after the list had been created. The handles of the newly opened windows are then passed (110) to the program analyzer 101, which determines those windows belonging to the target application process 104. The handles of the newly opened window (s) of the target application process 104 are passed (111) to the window explorer 112 one-by-one, which then uses each window handle to determine if each window has already been seen, or if it is new. This can be accomplished by examining the information about each window already stored in the application windows list 116, as received therefrom on path 113. In the former case, where the "new" window has already been seen, the window explorer updates (114) the entry of the newly opened window in the Application Windows List 116 with the new handle of the window and with new handles of its controls. In the latter case, where the newly opened window has not been seen before, the window explorer 112 adds on path 115 the entry of the new window to the Application Window List 116 and determines its controls and menu items. The handle of each newly opened window is then passed on path 118 to the window processor 119, which uses the information contained in the Application Window List 116 to exercise each control of the window(s) 122.

Note should be made of the fact that while window handles of newly-opened windows can be used to obtain window information (class, name, list of controls), the handle information stored in the Application Window List 116 is outdated if the window has been closed and re-opened, but the remaining information is still available.

A significant problem encountered when one attempts to automate an unknown program is the general lack of information about the expected order in which the controls have to be pressed or exercised, and the type of the information that has is expected to be passed to the user-controllable fields of the windows.

A most straightforward way to exercise such a program would be to simply exercise the menu items and controls at random. However this technique has a number of drawbacks. For example, it may cause the immediate termination of the target application process 104, as it is most likely to result in too many error conditions being generated, or even in the initiation of an infinite loop.

A more useful approach that is adopted by these teachings is to attempt to estimate the content of the individual windows, the expected input, and the best order of execution based on the information obtained from each individual window. That is, the content of the individual windows, the expected input, and the best order of execution of the user controls is estimated based on a context derived from the window, and possibly also on certain heuristics, such as a typical input expected by a certain type of user-loadable text box (e.g., a file name, or a certain type of device, such as an identification of a drive versus an identification of a printer, etc.)

The best order of control processing is determined by a best order determination component 117 at the time the window explorer 112 obtains the list of the controls for a new window. An input to the best order determination component is from a module entitled lists of sequences of controls 123.

The task of the best order determination component 117 is simplified by the fact that most GUI applications utilize a number of standard windows. The most common types of interfaces, e.g., a Multiple Document Interface (MDI) or Single Document Interface (SDI), contain a menu with File operations (New, Open, Close, . . . , Exit) in the first submenu, and a large user-controllable field (see FIG. 5, in particular elements 502-505, as well as 506). In addition, a number of the dialogs displayed by many applications are standard: (Open, Save As, Find, Replace, etc). By taking advantage of the common appearance of these dialogs, the program or controller 100 can make an accurate estimate concerning the most common orders of operations, as well as of the information expected in the user-controllable fields.

When processing unknown windows, the most common orders of processing are preferably utilized. For example, most dialogs require a user to choose the information from the lists first, then type in the data for the edit fields, set the options using other controls, and finally click on the push buttons. Clicking on some of the buttons is likely to result in the termination of the dialog. As employed herein, these types of buttons are referred to as "terminal" buttons, and the execution of the "terminal" buttons is preferably left to the end of the processing of a given window. For example, in FIG. 6 the designator 606 indicates the terminal buttons "OK" and "Cancel".

As is evident from FIG. 6, a window can contain more than one terminal button. In addition, other fields may cause the termination of the window. Thus, a window can disappear before all of its controls are processed. However, in order to maximize the code coverage all of the controls present in the window should be exercised before the window is closed.

In accordance with the presently preferred embodiment of this invention, if a newly displayed window disappears before all of its controls are explored and exercised, the action that initially caused the window to be displayed is repeated until all controls in the window are processed, but the step that caused the closing of the window is not repeated unless it is required to terminate the window, and it is the only terminal control.

Many operations will typically cause another window or several windows to be displayed. In this case the described method is applied recursively to each new window that opens, before the processing of the original window is resumed. Once the new window(s) are processed, control is returned to the previously processed window and the processing of its interface objects is resumed at the next interface object.

Figure 2:
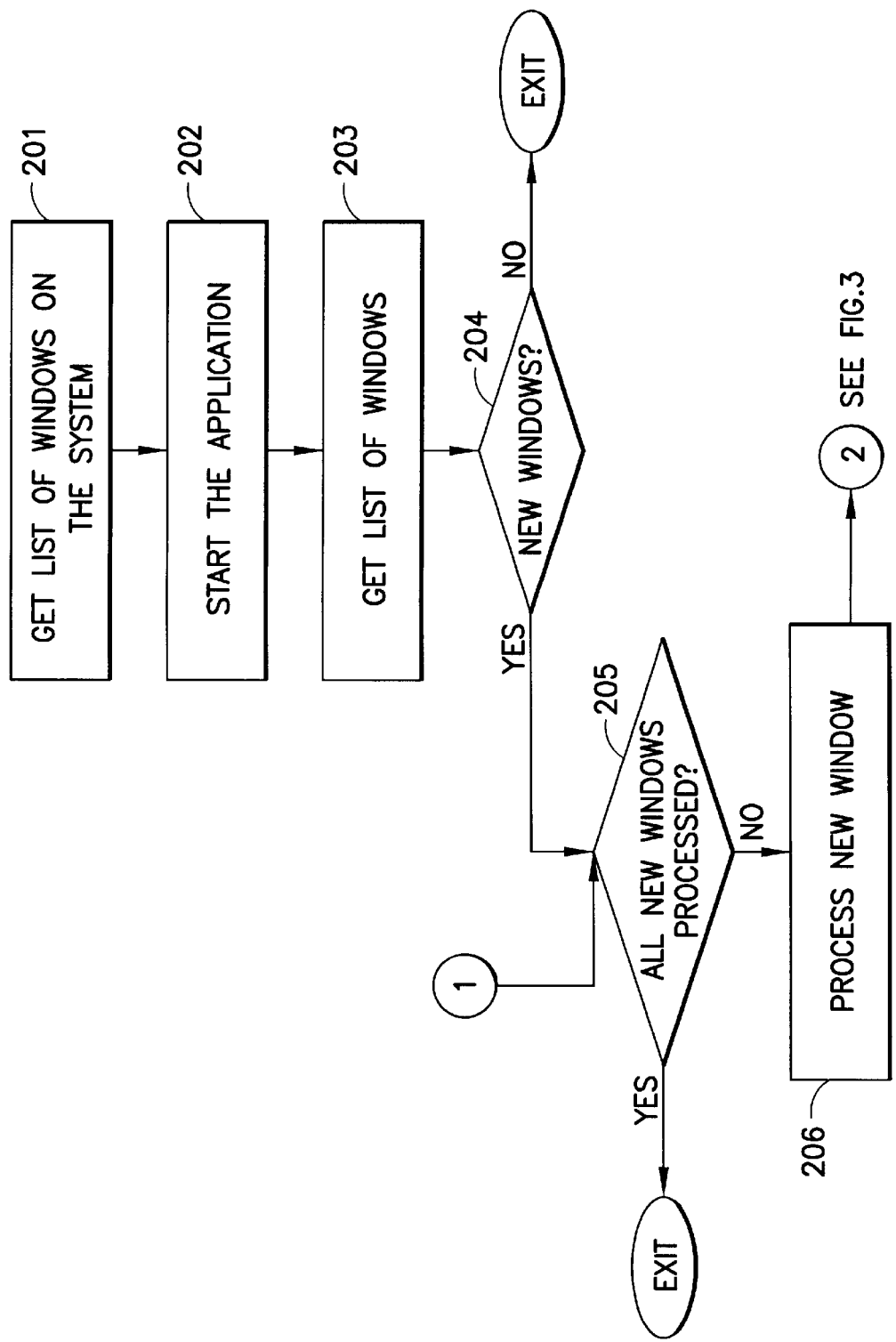
FIGS. 2, 3 and 4 are logic flow diagrams of a method in accordance with these teachings.
Figure 3:
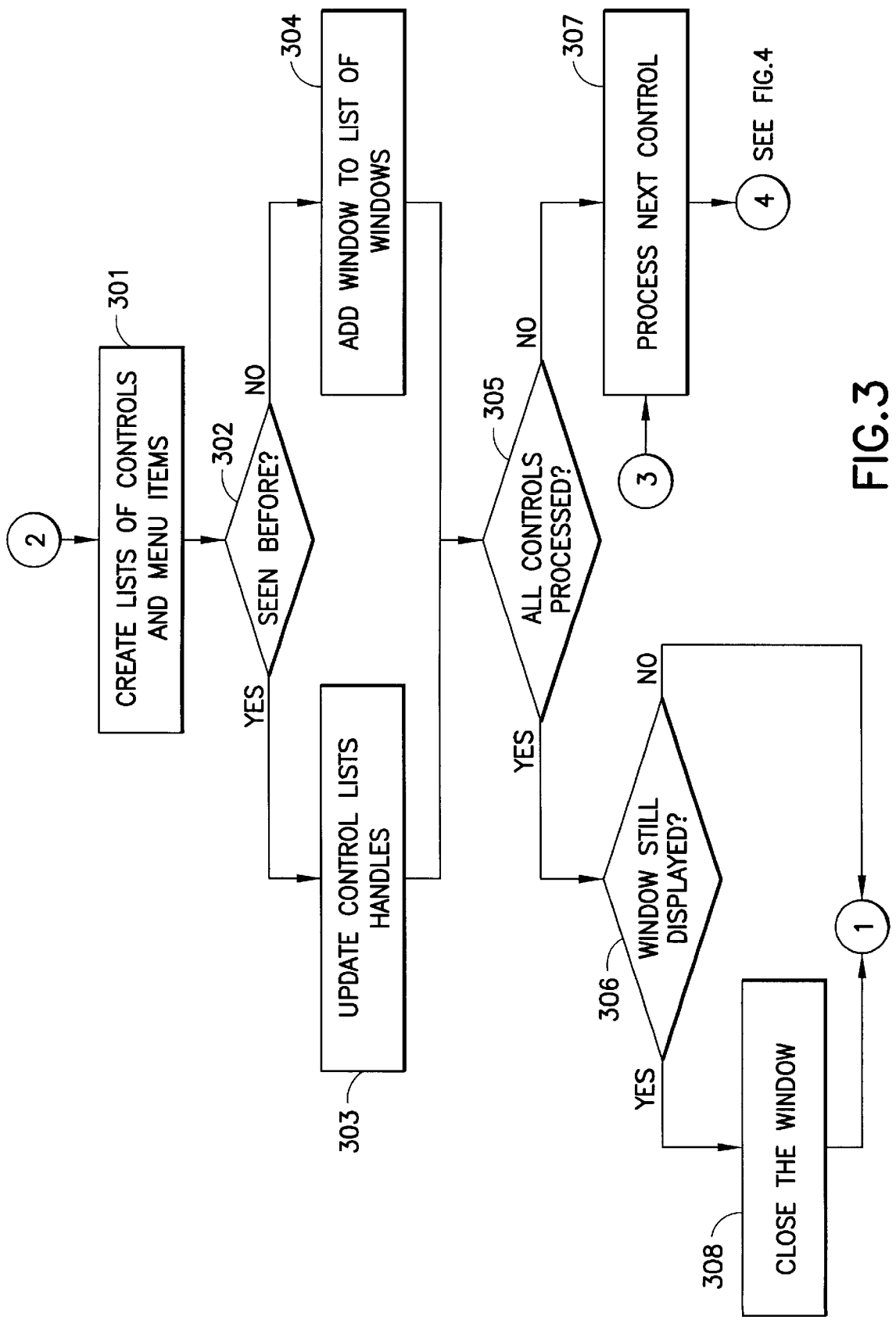
Figure 4:
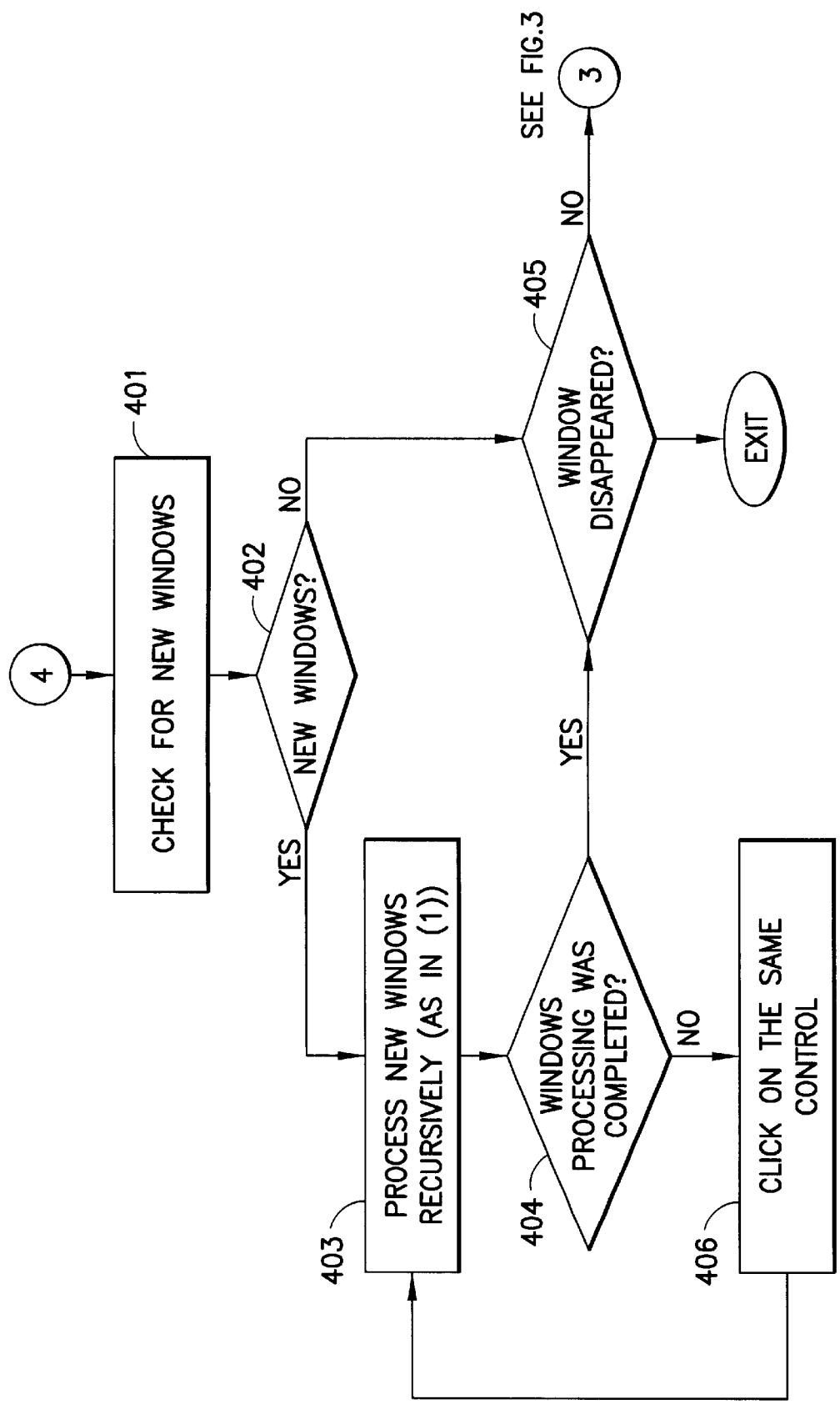

An algorithm that reflects the method in accordance with the teachings of this invention is shown in the logic flow diagrams of FIGS. 2, 3 and 4.

Beginning with FIG. 2, and referring as well to FIG. 1, at Step 201 the list of all opened windows on the system is obtained from system windows list 109 before the application is started at Step 202. The windows are enumerated again at Step 203 to determine at Step 204 if any were displayed by the application started in Step 202. If the application did not display any windows, an assumption is made that the application does not have a GUI and, thus, cannot be exercised by the present method. In this case the method terminates. If there are on or more windows displayed by the target application process 104, each of the newly opened windows is processed, as shown in FIG. 3, until all new windows are processed (Steps 205, 206).

Referring to FIG. 3, the lists of controls and menu items are created at Step 301 and sorted according to the preferred order of exercising. The sorted list(s) can be stored in the lists of sequences of controls 123 for use by the window processor 119. At Step 302 a determination is made as to whether the present window has been seen previously. If it has, at Step 303 the control lists are updated with the new handles, otherwise, the information about the new window is determined at Step 304 and added to the list of application windows 116. At Steps 305 and 307 each control in the currently open window is processed in the determined order until all controls are processed, at which time a determination is made at Step 306 if the window is still displayed (after all of the controls have been processed.) If the window is still displayed, it is closed at Step 308 by force, e.g., using a WM_CLOSE( . . . ) message. The individual window processing routine then exits and the processing continues with the next new window at Step 205.

Referring now again to the Process Next Control Step 307 of FIG. 3, and referring to FIG. 4 for more details, after each control is processed, the windows are again enumerated at Step 401. Any new windows belonging to the target application process 104 are processed recursively at Steps 403, 404 and 405 (Step 204 of FIG. 2). Upon completion, a test is made at Step 405 if the processing of newly displayed windows terminated prematurely (the window closed or disappeared). In this case the individual window processing exits with an appropriate return code. This code is checked in Step 404.

It should be noted that once a control is determined to cause premature closing of the window, the same control is preferably not re-invoked. This avoids the possibility of initiating an infinite loop, as on the subsequent invocation of the window processing, different controls are exercised.

The target application process 104 may terminate as a result of a command. In this case, the target application process 104 is restarted. In order to maximize the coverage and to avoid unnecessary repetitions and a possible infinite loop, a metric of interface coverage is maintained in the Application Windows Lists 116 of FIG. 1. That is, a record is maintained of the steps that caused the termination of the target application process 104. If the target application process 104 is restarted, the method for exercising the target application process 104 continues at the next step. The step that caused the process to terminate is not repeated (unless it is needed later for target application process termination.) When sufficient code coverage is detected, the method is terminated. If method of this invention is being executed for the purpose of computer virus replication, such as to obtain a number of instances of a particular computer virus, the method is terminated when this goal has been achieved.

With regard to the measurement of code coverage, a suitable minimum value for the amount of code coverage may be determined by any suitable method or external agency, and need not form a part of the teachings of this invention.

With regard to the identification of windows belonging to the target application process 104, one of the tasks of the program analyzer 101 of FIG. 1 is to identify which of the newly opened windows 122 belong to the target application process 104. This is accomplished by determining the process id of the target application process 104, via the process API 103, early on in the method, and by comparing the identified target application process id with that of each newly opened window.

Each of the windows 122 displayed by the system is assigned a unique handle. All other information about a window, including its name, class, and the id of the process that created it, can be obtained using the window handle via standard APIs. For example, the EnumWindows( . . . ) API traverses all top-level windows in the system and may pass the window handle of each window to a user-provided callback routine. So long as the process id of the target application process 104 is known, the windows belonging to the target application process 104 can be readily identified. Depending on how the target application process 104 was invoked, the process id may already be known. For example, if the target application process 104 was launched via a CreateProcess( . . . ) API call, the process id is already known.

Another technique to identify the target application windows 122, when the process id of the target application process 104 is not known, is to call EnumWindows( . . . ) before and after the target application process 104 is started. This involves maintaining the list of all windows on the system (system windows list 109) throughout the execution of the method.

With regard to the processing of new windows, any new windows that appear after exercising an interface object are identified by enumerating top-level windows before and after each operation. This is the task of the windows enumerator 106.

In some cases, a new window may belong to another application. For example, activating a Help menu item in some applications will result in an invocation of the windows help program. When this happens, two courses of actions are possible. In the preferred embodiment, the new program is exercised recursively. This, however, may not be practical as it may have a considerable impact on efficiency. In another embodiment, any new window that opens is closed immediately if it does not belong to the target application process 104 that is currently being exercised.

In most cases an operation will result in the appearance of a single new window. However, in some cases two or more windows may appear. Since a goal of these teachings is to simulate the actions of a normal user to the greatest extent possible, the new windows are preferably processed in the same manner that the user would interact with the new windows. In order to determine how a user would choose which new window to operate in first, it is important to understand the conditions under which more than one window are displayed by a typical application program.

The windows that are displayed by an application program can be, for example, another menu window (e.g., a new view in a MDI interface or a new view of the same window), a modal dialog which requires the user to respond before continuing the program, or a modeless dialog which stays on the screen and which can be used at any time, but permits other user activities. Since modeless dialog boxes can be used at any time, their order of selection of execution is not critical.

When an application program displays more than one window at one time, it is often the result of the following actions: the application program attempts to display a window (e.g., a modal dialog box or another view); or the window processing module 119 detects an error or requires additional information and displays another window to obtain this information (usually a message box or a modal dialog box if the first window is a view).

In both of these cases the newly displayed window(s) most likely have a parent-child relationship with each other, and the window that is to be processed first is the window that has no top-level child windows.

For example, in the following case:

Program→window A child of the program→window B child of window A thus, window B is processed first, followed by window A.

If the newly displayed windows have no parent-child relationship with each other, the order of their processing is assumed to be immaterial, and the next window to be processed can be selected at random, or by using any suitable heuristic.

With regard to the processing of individual windows, the method maintains the list of windows pertaining to the target application process 104 being exercised (list 116). The information that is maintained about each application window includes its handle, name (a title displayed at the top of the window), class (an internal identifier used by the system), lists of the interface objects contained in the window, the state of the window (opened or closed), coverage information and the interface objects that caused the closing of the window.

The window handle is only constant while the window is open (displayed on the system). When the window is closed and then reopened, its handle changes. This creates an additional complexity in cases when a window closes before the processing is complete and then is reopened in order to complete the processing. In these cases it is preferable to recognize the window as a partially processed window. The class-name combination does not always uniquely identify the window, as it is possible for the window to have a different look with the same class and name. Since in the instant case the look and feel of the window is important, two windows are considered identical only if they have the same class, name and controls. In the case where a newly opened window has the same name, class and controls as a window present on the application windows list 116, it is not added to the list 116. Instead, the handles of the corresponding window on the list 116 and each of its controls are updated by the window explorer 112 via path 114.

While it is sometimes necessary to use non-terminal controls more than once, the same is not true for the menu items. For example, it may be necessary to set a value in an input field and to check one or more boxes before the dialog is closed by the Cancel button, and before it is closed by the OK button. There is, however, no reason to repeat exercising the same menu item each time the window is opened. Therefore, it is preferred that each menu item is only used once, no matter how many times a particular window is opened.

Avoiding both terminal controls and previously used menu items is beneficial in the resolution of the case where the use of an interface object results in a different look for the same window, e.g., an appearance of additional controls or menu items. This case manifests itself by a replacement of an old window by a new one with the same class and name, but different controls. Since the new window has different controls, for the purposes of the teachings of this invention it is considered to be a new window.

However, improper handling of this case can result in the generation of an infinite loop:

```
(1)     window1
        object1
        object2      -----> window 1 is replaced with window 2
                            (same name and class)
        object3
(2)     window2
        object1
        object2      -----> window 2 is replaced with window 1
        object3
(3)     window1
        object1
        object2      -----> window 1 is replaced with window 2
        object3
etc . . .
```

Avoiding the window objects that have already been explored and determined to be terminal resolves this situation, as the new window in (3) will be recognized as a partially processed window (1), and the object 2 as a terminal object. The object 2 will thus not be repeated. If both object1 and object2 are the menu items, neither of them will be repeatedly used in (3). Therefore, in this case, step (3) resembles:

if object1, object2 and object3 are controls—object 2 is
   skipped as a terminal object:
   (3) window1
       object1
       object3
if the object are menu items—both object1 and object2
   are skipped
   (3) window1
       object3

With regard to obtaining lists of a window's interface objects, it is noted that in order to simulate a user of a GUI the method needs to obtain certain information about the look of each window. This information includes, but need not be limited to, window name and class, the presence and content of a window menu, and the type and look of controls. The information about the menu items can be obtained using standard APIs.

For example, on the Microsoft Windows(tm) system, the APIs used are GetMenu( . . . ) and GetSubMenu( . . . ).

The information concerning the controls can be obtained using the parent-child relationship of windows. This is because, in a windows system, all controls are windows as well, and all controls contained in a window are child windows of the window they are contained within. The list of all controls of a particular window can thus be obtained by traversing the list of the child windows of the particular window using standard windows APIs.

There are at least two issues pertaining to the window controls. The first is the choice of the values for the input fields, such as Edit field. The second is the order in which the individual controls should be used.

In one embodiment the standard dialogs are recognized by their title. However, this approach is not preferred if the application text is written in a language other than English. Therefore, in the preferred embodiment, the language of the target application process 104 is determined and a thesaurus 124 provides an input to the best order determination unit 117. The thesaurus 124 is used to determine the titles of the standard dialogs and to recognize text on the standard buttons. The information about the type of the dialog can be used in the determination of the type of information to be passed to the entry fields, and in the determination of the execution order.

There are several standard types of the window controls, all of which are preferably handled by the method in accordance with these teachings. The type of a control is determined by its window class. For example, a window implementing an Edit control will have a class of "Edit" or "RichEdit". A combination box window will have a class of "ComboBox". A check box, radio button, push button will all have a class of "Button". When several types of controls are represented by the same class, as in the case of a button control, the more detailed information can be obtained via standard APIs.

The choice of the value for the Edit controls is an important consideration, as an incorrect choice for Edit Control value will typically test an error path of the target application process 104 which is usually the simplest. While it is not generally possible to always guess the expected value, the present embodiment of the method examines the type of the dialog and its other controls, such as Combo Boxes. It may also be possible to "guess" the expected value by parsing text displayed in the static controls adjacent to the input fields. For example, a value for the Open dialog should be a name of an existing file. The most likely extension for this file is the one currently specified in the field, or the extension contained in the Combo Box field displayed on the same dialog.

The present embodiment of the method handles the most likely settings for "setable" controls, while a most preferred embodiment exercises both valid and invalid settings.

The order of the processing of dialog controls are based on their type. For example, the Combo boxes are generally processed first, followed by the Edit fields, and the buttons are processed last since they are likely to cause the termination of the dialog. Among the buttons, those which are most likely to cause termination of the dialog (Open, Save As, OK, Cancel, etc.) are processed last. This sequence information may be stored in the lists of sequences of controls module 123.

Since a dialog can terminate before all of its controls are processed, the dialog may need to be invoked multiple times. In order to avoid starting an infinite loop, all controls that are determined to be terminating controls are not processed again until the dialog is completely processed.

With regard to the handling of the menu items, the available information concerning each menu or submenu item includes its name (Open, Close, etc.) and its command identifier. The command identifier is a number that can be passed as a parameter in a WM_COMMAND message when a user clicks on the item. Thus, in order for the method to simulate a mouse "click" on a particular menu item the method operates to send a WM_COMMAND message to the target application process 104, passing the command id as a parameter. Once the list of all submenu items is created, the order of testing of menu items is determined. In the preferred embodiment the finite lists of meaningful orders of menu items are tested. Both the name of each menu item and its position is preferably considered in determining the order. As with controls, the menu item that can cause the termination of the program is executed last. In one embodiment the first menu item (most likely New) is exercised first, followed by all window controls, followed by the remainder of the menu items.

It should be noted that the various functions discussed above can be implemented by software executing on the system controller 100 of FIG. 1. As such, the teachings of this invention also pertain to a computer program embodied on a computer readable medium. The program is operative to automatically exercise a target application process having a Graphical User Interface (GUI) by directing the computer to start the target application process; to detect a presence of windows opened by the GUI of the target application process, to process an opened window by determining a content of the window, including a list of user controls found in the window, to exercise the user controls in an order estimated by the computer program until all of the user controls have been exercised, and to then close the window. If exercising a particular user control causes the window to close before all of the window's user controls have been exercised, the program further directs the computer to reopen the window and to then exercise user controls other than the particular user control, unless the particular user control is required to close the window after all of the window's user controls have been exercised. If exercising a particular user control causes a second window to open, the program further directs the computer to determine a content of the second window, including a list of user controls, to exercise the user controls until all of the user controls of the second window have been exercised, to close the second window, and to then continue the processing of the first window. After individual ones of the user controls are exercised the program directs the computer to enumerate the system windows, to determine if there has been a change in the enumerated system windows due to a plurality of new windows being opened, to determine if a parent-child relationship exists between the plurality of new windows and, if a parent-child relationship exists, to process the child window before processing the parent window, and to then continue the processing of the first window. Preferably, exercising the user controls until all of the user controls have been exercised is accomplished with user controls likely to cause termination being identified and exercised after user controls that are less likely to cause termination.

While the teachings of this invention can be employed in a system wherein it is desired to elicit viral activity in a program suspected of harboring a virus, and/or to obtain samples of a suspected virus, the use of the teachings of this invention are not limited to only this one important application.

Thus, while the invention has been particularly shown and described with respect to preferred embodiments thereof, it will be understood by those skilled in the art that changes in form and details may be made therein without departing from the scope and spirit of the invention.

What is claimed is:

1. A method for automatically exercising a target application process having a Graphical User Interface (GUI), comprising the computer executed steps of:
   starting the target application process;
   detecting a presence of a first window opened by the target application process;
   processing the first window by determining a content of the first window, including a list of user controls;
   exercising the user controls until all of the user controls have been exercised, with user controls likely to cause termination being identified and exercised after user controls that are less likely to cause termination; and
   closing the first window.

2. A method as in claim 1, wherein if exercising a particular user control causes the first window to close before all of the user controls have been exercised for the first window, the method further comprises steps of:
   reopening the first window; and
   exercising user controls other than the particular user control unless the particular user control is required to close the first window after all of the first windows user controls have been exercised.

3. A method as in claim 1, wherein if exercising a particular user control causes a second window to open, the method comprises steps of:
   determining a content of the second window, including a list of user controls;
   exercising the user controls until all of the user controls of the second window have been exercised;
   closing the second window; and
   continuing the processing of the first window.

4. A method as in claim 1, wherein the step of exercising includes steps of estimating a best order of execution of user controls and text to be input to user input fields.

5. A method as in claim 1, wherein the step of exercising includes steps of estimating a best order of execution of button user controls and text to be input to user input fields.

6. A method as in claim 1, wherein after each user control is exercised the method comprises further steps of:
   enumerating the system windows; and
   determining if there has been a change in the enumerated system windows due to a new window being opened; and
   if there has been a change, processing the new window before resuming the processing of the first window.

7. A method as in claim 1, wherein after each user control is exercised the method comprises further steps of:
   enumerating the system windows;
   determining if there has been a change in the enumerated system windows due to a new window or windows being opened; and
   identifying if the newly opened window or windows are associated with the target application process by comparing a process id of the target application process with the process id of each newly opened window.

8. A method as in claim 1, wherein after each user control is exercised the method comprises further steps of:
enumerating the system windows;
determining if there has been a change in the enumerated system windows due to at least one new window being opened;
identifying if the newly opened window is associated with the target application process by comparing a process id of the target application process with the process id of the newly opened window;
if the new window is not associated with the target application process, one of processing the new window or closing the new window; and
continuing the processing of the first window.

9. A method as in claim 1, wherein after each user control is exercised the method comprises further steps of:
enumerating the system windows;
determining if there has been a change in the enumerated system windows due to a plurality of new windows being opened;
determining if a parent-child relationship exists between the plurality of new windows;
if a parent-child relationship exists, processing the child window before processing the parent window, else processing the plurality of new windows in any order; and
continuing the processing of the first window.

10. A method as in claim 1, wherein the step of processing comprises a step of maintaining a list of windows associated with the target application process, the list comprising, for each window, the window's handle, name, class, a list of user controls contained in the window, a state of the window, and an identification of any user controls that have caused the window to close.

11. A method as in claim 10, wherein two windows are considered identical only if they have at least the same class, name and user controls, and wherein if a new window has at least the same class, name and user controls as a window present in the list of windows, the new window it is not added to the list of windows, but instead the handle of the corresponding window in the list, and its user controls, are updated.

12. A method as in claim 1, wherein an order of processing of dialog user controls are based on their type.

13. A method as in claim 12, wherein Combo box dialog user controls are processed first, followed by Edit fields, followed by button user controls, wherein among the button user controls those which are most likely to cause termination are processed last.

14. A method as in claim 1, wherein the user controls include menu items, and wherein during the step of executing a click on a particular menu item is simulated by sending a command message to the target application process, passing the command id as a parameter.

15. A method as in claim 1, wherein the user controls include menu items and submenu items, and wherein the step of processing includes a step of creating a list of all submenu items, and a step of determining an order of testing of menu items by considering both the name of each menu item and its position, with those menu items that can cause termination being executed last.

16. A computer system for automatically exercising a target application process having a Graphical User Interface (GUI), comprising a controller for starting and exercising the target application process using Application Program Interfaces (APIs), said controller detecting a presence of a first window opened by the GUI target application process and, in response, processing the first window by determining a content of the first window, including a list of user controls; said controller further exercising the user controls until all of the user controls have been exercised and for then closing the first window, with user controls likely to cause termination being identified and exercised after user controls that are less likely to cause termination.

17. A system as in claim 16, wherein if exercising a particular user control causes the first window to close before all of the user controls have been exercised for the first window, said controller responds by reopening the first window; and exercising user controls other than the particular user control unless the particular user control is required to close the first window after all of the window's user controls have been exercised.

18. A system as in claim 16, wherein if exercising a particular user control causes a second window to open, the controller responds by determining a content of the second window, including a list of user controls, exercising the user controls until all of the user controls of the second window have been exercised, closing the second window and continuing the processing of the first window.

19. A system as in claim 16, wherein the controller estimates a best order of execution of user controls, including button user controls, and text to be input to user input fields.

20. A system as in claim 16, and further comprising a list of open system windows, and a window enumeration unit responsive to an individual one of the user controls being exercised for enumerating the system windows and for determining if there has been a change in the enumerated system windows due to a new window being opened, wherein said controller is responsive to a determined change for selectively processing the new window before resuming the processing of the first window.

21. A system as in claim 20, wherein said window enumeration unit identifies if a newly opened window is associated with the target application process by comparing a process id of the target application process with the process id of each newly opened window.

22. A system as in claim 21, wherein if the newly opened window is not associated with the target application process, said controller operates further to one process the newly opened window or to close the newly opened window, and to then continue the processing of the first window.

23. A system as in claim 20, wherein if said window enumeration unit determines that there has been a change in the enumerated system windows due to a plurality of new windows being opened, said controller responds by determining if a parent-child relationship exists between the plurality of new windows; and if a parent-child relationship is determined to exist, processes the child window before processing the parent window, else said controller processes the plurality of new windows in any order, and then continues the processing of the first window.

24. A system as in claim 16, and further comprising a list of windows associated with the target application process, the list comprising, for each window, the window's handle, name, class, a list of user controls contained in the window, a state of the window, and an identification of any user controls that have caused the window to close.

25. A system as in claim 24, wherein two windows are considered identical only if they have at least the same class, name and user controls, and wherein if a new window has at least the same class, name and user controls as a window present in the list of windows, the new window it is not added to the list of windows, but instead the handle of the corresponding window in the list, and its user controls, are updated.

26. A system as in claim 16, wherein an order of processing of dialog user controls are based on their type, wherein Combo box dialog user controls are processed first, followed by Edit fields, followed by button user controls, and wherein among button user controls those which are most likely to cause termination are processed last.

27. A system as in claim 16, wherein the user controls include menu items, and wherein said controller simulates a click on a particular menu item by sending a command message to the target application process, passing the command id as a parameter.

28. A system as in claim 16, wherein said user controls comprise menu items and submenu items, and wherein said controller operates to create a list of all submenu items and to determine an order of testing of menu items by considering both the name of each menu item and its position, with those menu items that can cause termination being executed last.

29. A computer program embodied on a computer readable medium, said program being operative to automatically exercise a target application process having a Graphical User Interface (GUI) by directing the computer to start the target application process; to detect a presence of windows opened by the GUI of the target application process, to process an opened window by determining a content of the window, including a list of user controls found in the window, to exercise the user controls in an order estimated by the computer program until all of the user controls have been exercised, and to then close the window, wherein if exercising a particular user control causes the window to close before all of the window's user controls have been exercised, said program further directs said computer to reopen the window and to then exercise user controls other than the particular user control, unless the particular user control is required to close the window after all of the window's user controls have been exercised, and wherein if exercising a particular user control causes a second window to open, said program further directs said computer to determine a content of the second window, including a list of user controls, to exercise the user controls until all of the user controls of the second window have been exercised, to close the second window, and to then continue the processing of the first window.

30. A computer program as in claim 29, wherein after individual ones of the user controls are exercised said program directs said computer to enumerate the system windows, to determine if there has been a change in the enumerated system windows due to a plurality of new windows being opened, to determine if a parent-child relationship exists between the plurality of new windows and, if a parent-child relationship exists, to process the child window before processing the parent window, and to then continue the processing of the first window.

31. A computer program as in claim 29, wherein the step of exercising the user controls is accomplished with user controls likely to cause termination being identified and exercised after user controls that are less likely to cause termination.

32. A computer program as in claim 29, wherein the program is executed when it is desired to at least one of elicit viral activity in a program suspected of harboring a virus or to obtain samples of a suspected virus.

* * * * *